United States Patent

[11] 3,563,285

[72] Inventor Elbridge W. Thrasher
    Ukiah, Calif.
[21] Appl. No. 840,613
[22] Filed July 10, 1969
[45] Patented Feb. 16, 1971
[73] Assignee Masonite Corporation
    a corporation of Delaware

[54] BAND SAW GUIDE AND APPARATUS
    9 Claims, 5 Drawing Figs.
[52] U.S. Cl. .................................................. 143/27,
    143/160; 83/201.14, 83/201.15
[51] Int. Cl. ........................................................ B27b 13/08,
    B27b 13/10
[50] Field of Search ................................................. 143/27,
    160; 83/201.14, 201.15

[56] References Cited
    UNITED STATES PATENTS

| | | | |
|---|---|---|---|
| 328,094 | 10/1885 | Walker | 143/27 |
| 1,580,407 | 4/1926 | Carlson | 143/27 |
| 3,362,445 | 1/1968 | Butzin et al. | 143/27 |
| 3,390,710 | 7/1968 | Cookson et al. | 143/27 |
| 3,452,734 | 7/1969 | Cleland et al. | 143/32 |
| | | | 148/160 |

Primary Examiner—Donald R. Schran
Attorney—Eckhoff and Hoppe

ABSTRACT: A band saw of the commercial type employed in lumber mills having a pair of spaced apart first and second wheels and a continuous saw blade or band entrained around said wheels, an improved saw guide and apparatus comprising one or more springs yieldably urging the first wheel in a direction generally away from the second wheel to apply tension to the saw blade; and a rapid response-low inertia saw guide that will eliminate or substantially reduce momentary slack in the saw band while maintaining the cutting edge of the blade in a predetermined cutting plane.

In a band saw of the kind described, the saw guide being more particularly characterized in that it is disposed intermediate the first and second wheels and comprises a contact member positioned to engage the inside surface of the blade as the blade moves from the first wheel toward the second wheel, the contact member having a first contact portion that provides a fixed line of contacts forward of an imaginary line connecting the points of tangency between the wheels and a movable contact portion that contacts the blade in a region intermediate the first contact portion and the first wheel; and a rapid response-low inertia means urging the movable contact portion against the saw blade to maintain tension in that area of the blade between the first wheel and the fixed line of contacts.

PATENTED FEB 16 1971

INVENTOR.
ELBRIDGE W. THRASHER
BY
ATTORNEYS

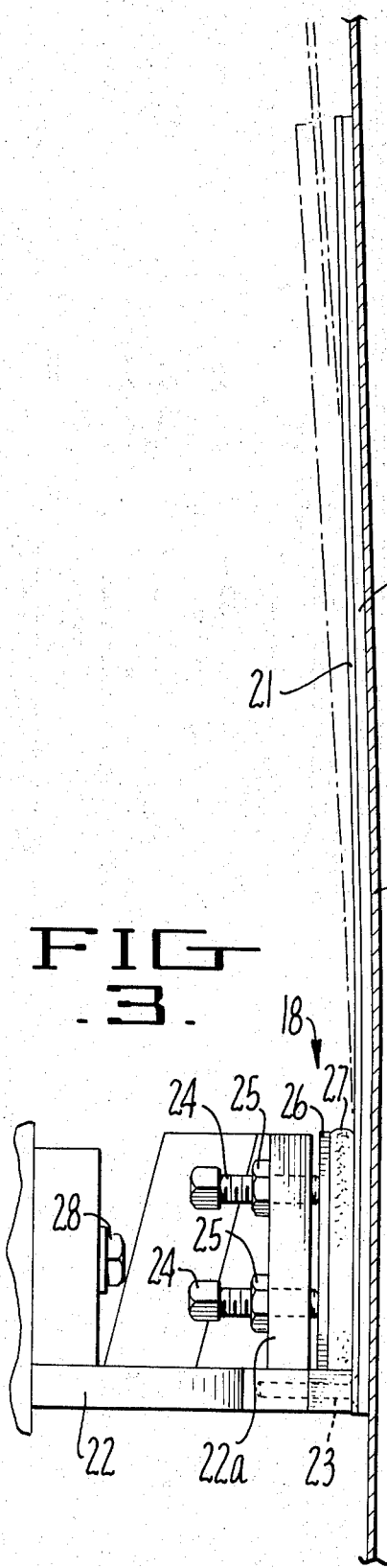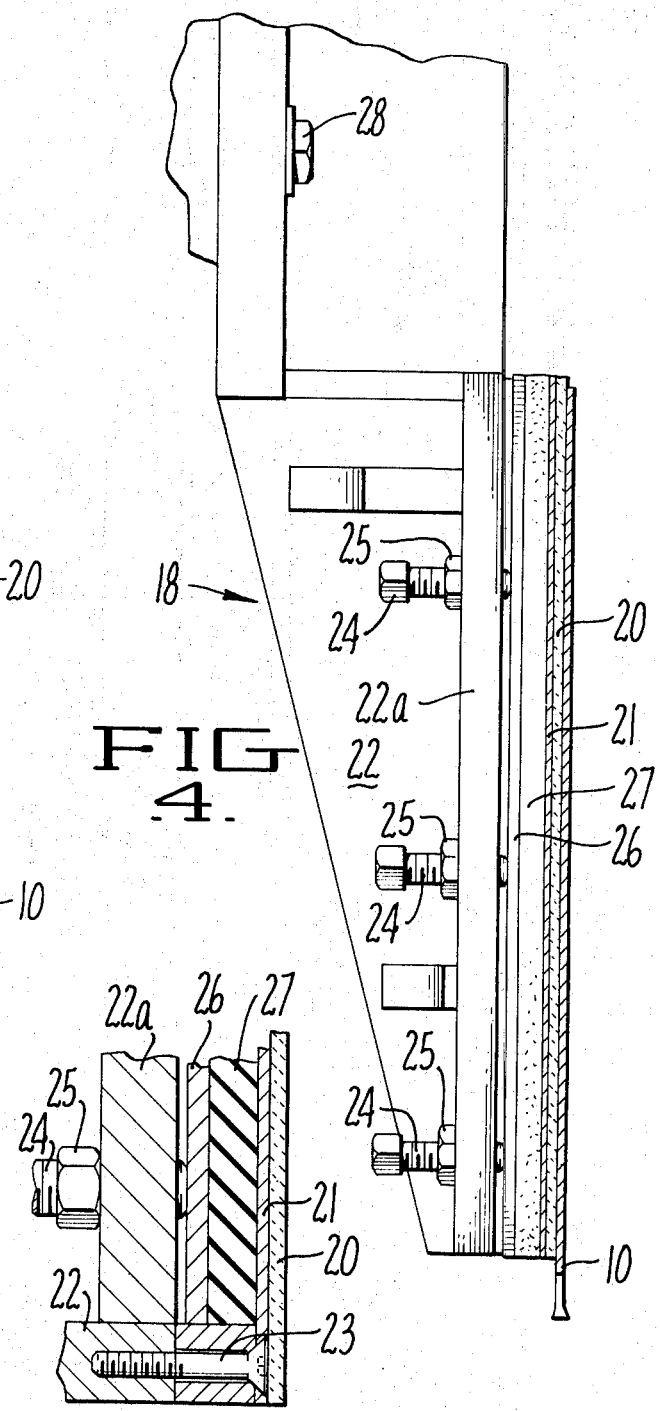

BAND SAW GUIDE AND APPARATUS

This invention relates to an improvement in band saws and band saw constructions of the commercial type customarily employed in lumber mills. The improvement more particularly involves the use of a saw guide and related apparatus which maintains tension in the saw blade while eliminating or substantially reducing slack in the blade.

In general, most saw mills currently employ a band saw comprising a pair of spaced wheels, a continuous saw blade or band entrained around the wheels, and means urging one wheel in a direction generally away from the other to place the saw blade in tension. The two wheels normally rotate at the same peripheral speed, one wheel being driven by the other through the band connection. However, at various times during normal operation—as when a load is suddenly placed upon the blade—one wheel will overrun the other and produce slack in the saw blade. The slack is created when the one wheel which overruns the other overcomes the weight of the band tensioning device (a counterweight) and pulls itself down the blade much the same as a yoyo winds itself upon a string. Of course, the slack which is thus created is eventually taken up by the counterweight which tends to move one wheel away from the other. But, since the reaction time of the counterweight is governed by gravity alone, and inasmuch as the normal peripheral speed of the wheels and saw blade is approximately 7,500 to 10,000 feet per minute, the creation of some slack in the band saw is unavoidable. This slack is a serious detriment to the operation of the band saw since it forces the operator to reduce the feed of material into the saw and it necessitates the use of wider saw blade kerfs to maintain blade rigidity in the cutting plane.

Various attempts have been made to eliminate the problems which are apparently created by slack in the saw blade. The use of saw guides which engage the saw blade on both sides of the working area (and on the inside and outside of the blade) have been used with moderate success to reduce blade vibrations and guide the blade through the working area. But no saw guides have been previously devised which would effectively control or eliminate slack in the saw band.

However, applicant is aware of a recent attempt to improve the operation of band saws by placing an exceptionally heavy stress upon the saw band. This is accomplished by structural modifications in the machine which provide additional weights that force the two wheels apart so as to create a prestressing of the band. In operation, and as one wheel tends to overrun the other, the slack which would otherwise be produced in the saw blade is taken up by internal contraction of the band itself. While this appears to be an effective means for eliminating slack in the band, it necessitates substantial and expensive modifications to the normal machine construction. Moreover, the act of prestressing the saw band introduces strains, thereby reducing the safety factor with which the blades are designed.

In brief, the present invention involves a unique design for a saw guide that will place a resilient bias upon a contacted area of the saw band or blade, and more particularly in the area in which slack is apt to be produced. The saw guide further comprises a contact member having a portion that provides a fixed line of contacts forward of an imaginary line connecting the points of tangency between the wheels. Thus, any slack which may be created in the band will be taken up by the resilient bias without changing or adversely affecting the cutting line of the blade.

A second important feature of the invention resides in the substitution of one or a plurality of spring devices as a substitute for the use of counterweights. Such spring devices, unlike counterweights, provide a rapid response and relatively low inertia and moreover they apply a variable force proportional to the instantaneous distance between the band wheels. This creates a much more responsive lifting action for separating the wheels and eliminating slack which may occur.

From the foregoing, it will be apparent that one principal object of the present invention is to provide an improved saw guide and related apparatus capable of taking up or absorbing what would otherwise result in slack in the saw band.

Another object of the invention is of to provide a saw guide of the kind described and more particularly comprising a contact member positioned to engage the inner surface of the saw blade and having a rapid response-low inertia means urging portions of the contact member against the blade to take up momentary slack and dampen vibrations.

It is a further object to provide a saw guide for band saws of the kind described and which, because of its ability to remove or eliminate momentary slack in the saw band, permits the use of thinner saw blades having a narrower kerf.

A still further object of the invention is to provide an improved saw guide and related apparatus of the kind described which may be used with and applied to standard forms of commercial band saws without entailing expensive modifications.

Other objects of this invention will become apparent in view of the following detailed description and the accompanying drawings.

In the drawings forming a part of this application and in which like parts are identified by like reference numerals throughout the same;

FIG. 3 is an enlarged elevation of the upper saw guide;

FIG. 4 is a partial plan view of the upper saw guide; and

FIG. 5 is an enlarged detail and section of the upper saw guide more particularly showing one detail of its construction.

Figures 1, 2:
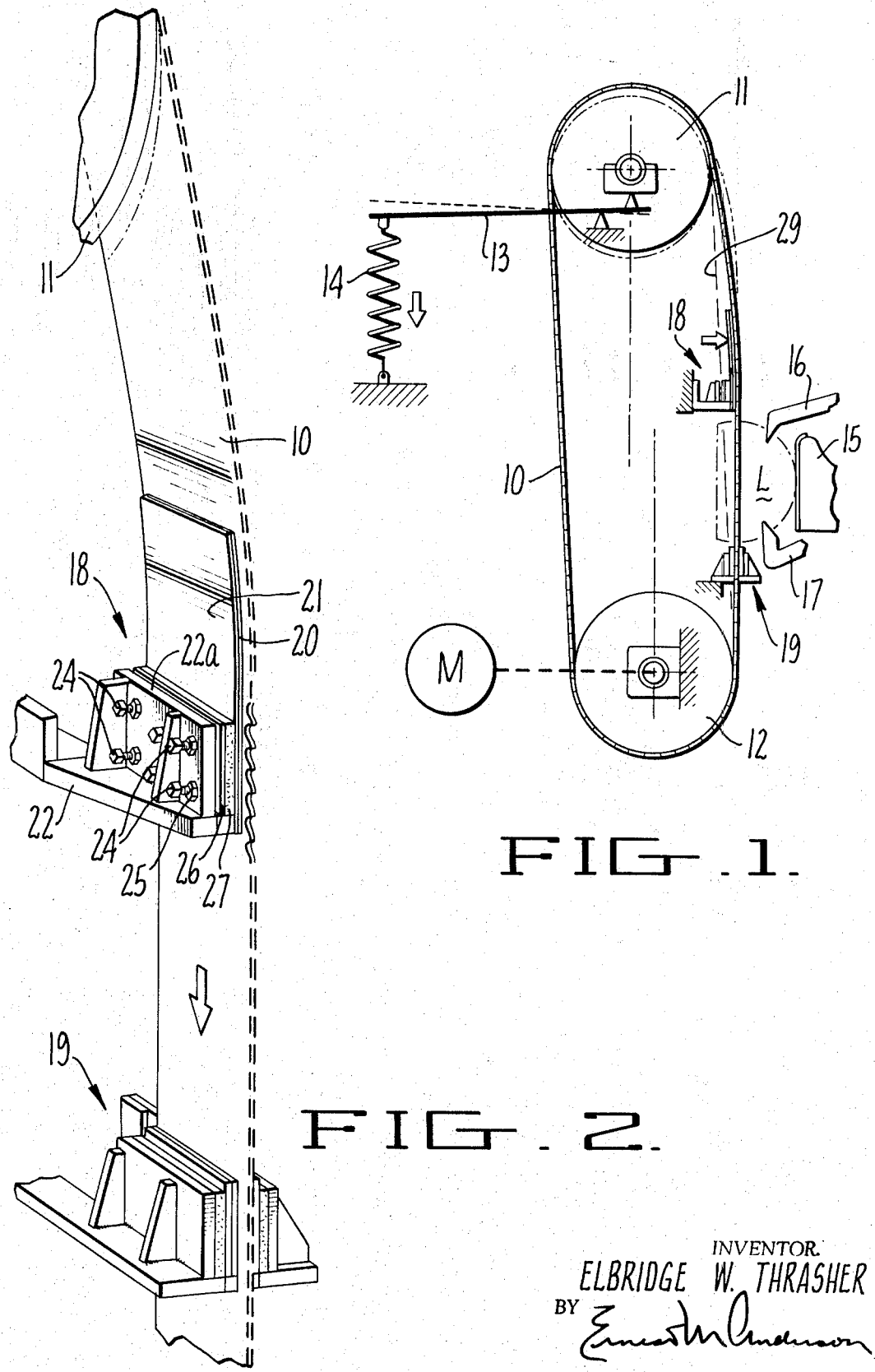
FIG. 1 is a schematic view of a band view equipped with a saw guide and related apparatus contemplated by this invention.
FIG. 2 is an enlarged perspective view of the saw guide arrangement illustrated in FIG. 1.

Referring to FIG. 1 there is illustrated a band saw as contemplated by this invention and as used in a head rig for a conventional lumber mill wherein a log L is mounted on a carriage (not shown) for movement into and through saw blade 10. The band saw further comprises a pair of spaced first and second wheels 11 and 12 around which the blade or saw band is entrained. Wheel 11 is supported on a lever 13, a coil spring 14 applying a force to the lever that counterbalances the usually massive weight of the wheel and applies a tension to saw blade 10. Wheel 12, on the other hand, is mounted in a fixed bearing and is driven by a motor M.

A typical log carriage which may be used in the apparatus shown is disclosed in U.S. Pat. No. 3,128,803. This carriage includes apparatus for holding and advancing a log while it is cut into cants. The apparatus comprises a knee 15 against which the log is held by a pair of dogs 16 and 17. It will be readily apparent to those skilled in the art that log L is first placed on the carriage lengthwise thereof; dogs 16 and 17 are then locked on the log so as to hold it tightly against the forward face of knee 15. Next, the knee and log are advanced to a position where the desired cut is to be taken; the carriage and log are moved through the saw to take a cut; and the carriage is then retracted. This cycle of operation is repeated, knee 15 being advanced a predetermined increment each time. Equipment of this type is well known and is typical of the equipment in many commercial saw mills.

The present invention is more particularly concerned with the use of spring device 14, which provides a rapid response-low inertia means for tensioning the saw blade, and a pair of saw guides 18 and 19. Saw guide 18 is of particular importance since it is uniquely constructed for taking up momentary slack in saw blade 12 while maintaining the blade in a predetermined cutting plane.

More specifically, saw guide 18 comprises a contact member 20, which may be made of micarta, secured as by an adhesive to a leaf spring 21. The bottom edge of the leaf spring is secured to a mounting bracket 22 by screws 23. Bracket 22 includes an upright backing 22a having a plurality of threaded openings which receive bolts 24, each bolt having a stop nut 25 which may be adjusted along the bolt. The end of each bolt contacts a rigid backing plate 26 which bears against a resilient layer 27 disposed between backing plate 26 and leaf spring 21. Layer 27 may be made of a foam rubber material, the purpose of this layer being to dampen vibrations.

Bracket 22 is adapted to be mounted to the frame of the hand saw or to a traveling support by means of bolts 28. Conventional band saws usually provide a traveling block for adjusting the vertical position of the upper saw guide and to locate the saw guide relatively close to the material or log being cut. In a preferred embodiment of this invention, it is also contemplated that saw guide 18 can be similarly mounted and adjusted in near proximity to the work piece. There is, however, one essential distinction between the mounting of saw guide 18 and the saw guides of a conventional machine. Referring to FIG. 1, it will be noted that wheel 11 rotates on an axis that is offset to the rear relative to a vertical line through the axis of wheel 12, and saw guide 18 is positioned in front of the imaginary line 29 connecting the points of tangency between the wheels. Thus, saw band 10 is drawn across contact member 20, which provides a fixed contact portion near the base of the mounting bracket 22 and a resilient movable contact portion intermediate the fixed contact portion and wheel 11. Leaf spring 21 is sufficiently stiff as to provide a rapid response, and the spring urges the movable contact portion against blade 10 to maintain tension in that area where slack is most apt to be produced.

The particular construction of saw guide 18 permits an adjustment in the tensioning of saw band 10 without affecting the predetermined cutting plane established by the lower edge of contact member 20. Referring to FIG. 3, should greater tension be desired, bolts 24 may be turned to advance each in the direction of backing plate 26, thereby moving the upper end of wear member 20 and leaf spring 21 to create greater flexing of the leaf spring. Inasmuch as spring 14 also imposes a tensioning upon blade 12, the same function may be accomplished by providing an adjustable connection in series with spring 14 as between its connection to lever 13 or its anchorage.

Although a single spring 14 is illustrated and described, it is more specifically contemplated that several spring devices may be utilized either in series or in parallel. Where the spring device or devices replace a counterweight, these devices should be selected with a spring constant and length which, when installed, produce substantially the same force as the counterweight which they replace. In this manner, the blade will be tensioned with approximately the same force for which the machine was designed. An increase in force will then occur only when wheel 11 overruns wheel 12 and this additional force will be proportional to the instantaneous distance between the wheels.

Saw guide 19 may be of a conventional design. It is preferable, however, that this saw guide provide relatively large planes of contact on both the inside and outside surfaces of the band loop, each plane of contact extending substantially the full width of blade 10. This saw guide should also be positioned near to the work piece——as is the customary practice where lower saw guides are employed——and the planes of contact should be located to guide the blade in a vertical plane extending from the line of tangency which blade 10 makes with wheel 12.

In operation, spring 14 and saw guide 18 complement each other and cooperate to eliminate or substantially reduce the amount of slack which is normally produced in the saw band during operation of conventional band saws. As a direct consequence of using this invention, applicant has been able to increase the production rate of a saw mill by as much as 10 percent while using saw kerfs as small as 0.100 inch.

Although a preferred embodiment of this invention has been illustrated and described, various modifications may be made without departing from the spirit of the invention or the scope of the attached claims, and each of such modifications and changes is contemplated.

I claim:

1. A band saw having a pair of spaced apart first and second wheels; a continuous saw blade entrained around said wheels; yieldable means urging said first wheel in a direction generally away from the second wheel to apply tension to said saw blade; and a saw guide for taking up momentary slack in said blade to eliminate blade vibrations while maintaining said blade in a predetermined cutting plane, said saw guide being disposed intermediate said first and second wheels and comprising a contact member positioned to engage the inside surface of said blade as the blade moves from said first wheel toward said second wheel, said contact member having a first contact portion that provides a fixed line of contacts forward of an imaginary line connecting the points of tangency between said wheels and a movable contact portion that contacts said blade in a region intermediate said first contact portion and said first wheel; and a rapid response-low inertia means urging said movable contact portion against said blade to maintain tension in that area of the saw blade between said first wheel and the fixed line of contacts.

2. The band saw of claim 1, said yieldable means having a rapid response and low inertia and comprising a device that applies a variable force proportional to the instantaneous distance between said first and second wheels.

3. The band saw of claim 1, said yieldable means comprising a lever that supports said first wheel and one or more spring devices connected to said lever for counterbalancing the weight of said first wheel and resiliently urging said first wheel away form the second wheel to tension said saw blade.

4. In combination with a band saw having a pair of space apart wheels; a continuous saw blade entrained around said wheels; yieldable means urging one of said wheels in a direction generally away from the other to apply tension to said saw blade; and a saw guide for taking up momentary slack in said blade to eliminate blade vibrations while maintaining said blade in a predetermined cutting plane, said saw guide being disposed intermediate said wheels and comprising a contact member positioned to engage the inside surface of said blade, said contact member having a first contact portion that provides a fixed line of contacts and a movable contact portion that contacts said blade intermediate the first contact portion and the nearest wheel; and a rapid response-low inertia means urging said movable contact portion against said blade to maintain tension in that area of the saw blade between said nearest wheel and the fixed line of contacts.

5. The combination of claim 4, said saw guide comprising a leaf spring supported at one end and in back of said contact member yieldably urging said contact member against the inner surface of said saw blade, one end of said leaf spring being relatively fixed to maintain one portion of said contact member in a fixed guide plane, the other end of said leaf spring applying a resilient force against another portion of said contact member to tension the saw blade in a region intermediate the saw guide and that wheel which tends to produce slack in the saw blade by overrunning the other wheel.

6. The apparatus of claim 4, said contact member providing a contact surface forward of an imaginary line connecting the points of tangency between said wheels, said yieldable means effecting a separation of said wheels and imposing a tension in the means for urging portions of said contact member against said blade.

7. The combination of claim 4, said saw guides comprising a leaf spring having a width approximately that of the saw blade, a flexible wear plate of approximately the same width as said leaf spring and mounted in front of said leaf spring for making contact with said saw blade, means for mounting one end of said leaf spring and one end of said wear plate in a predetermined guide plane, the other end of said leaf spring and wear plate being movable and imparting a resilient force against said blade, said one end of said wear plate providing a contact surface forward of an imaginary line connecting the points of tangency between said wheels.

8. The combination of claim 7, said saw guides further comprising a rigid backing member, a resilient pad disposed in back of said leaf spring between said leaf spring and said rigid backing member, and means for adjustably positioning said backing member to compress said resilient pad against the back surface of said leaf spring.

9. In combination with a band saw having a pair of spaced apart wheels; a continuous saw blade entrained around said wheels; yieldable means urging one of said wheels in a direction generally away from the other to apply tension to said blade, said yieldable means comprising a device that applies a variable force proportional to the instantaneous distance between said pair of spaced apart wheels; and a pair of saw guides engaged with the working sides of said saw blade and disposed on opposite sides of the working area, one of said saw guides comprising a contact member positioned to engage the inside surface of said blade, said contact member having a first contact portion that provides a fixed guiding surface and a movable contact portion; and a rapid response-low inertia means urging said movable contact portion against said blade to maintain tension in the blade.